United States Patent
Schuster et al.

(10) Patent No.: US 10,255,357 B2
(45) Date of Patent: Apr. 9, 2019

(54) PROCESSING OF AN ELECTRONIC DOCUMENT, APPARATUS AND SYSTEM FOR PROCESSING THE DOCUMENT, AND STORAGE MEDIUM CONTAINING COMPUTER EXECUTABLE INSTRUCTIONS FOR PROCESSING THE DOCUMENT

(71) Applicant: DOCUWARE GMBH, Germering (DE)

(72) Inventors: Daniel Schuster, Dresden (DE); Klemens Muthmann, Dresden (DE)

(73) Assignee: DocuWare GmbH, Germering (DE)

( * ) Notice: Subject to any disclaimer, the term of this patent is extended or adjusted under 35 U.S.C. 154(b) by 336 days.

(21) Appl. No.: 14/138,401

(22) Filed: Dec. 23, 2013

(65) Prior Publication Data

US 2014/0181114 A1  Jun. 26, 2014

(30) Foreign Application Priority Data

Dec. 21, 2012 (DE) .................. 10 2012 025 351

(51) Int. Cl.
*G06F 17/30* (2006.01)
*G06F 7/24* (2006.01)

(52) U.S. Cl.
CPC .......... *G06F 17/30722* (2013.01); *G06F 7/24* (2013.01); *G06F 17/30011* (2013.01)

(58) Field of Classification Search
CPC .............. G06F 17/30722; G06F 7/24; G06F 17/30011; G06F 17/30705
USPC ...................................................... 707/740
See application file for complete search history.

(56) References Cited

U.S. PATENT DOCUMENTS

| | | | | |
|---|---|---|---|---|
| 7,065,532 B2 * | 6/2006 | Elder | ................ | G06F 17/30722 |
| 8,156,128 B2 * | 4/2012 | Ramer | ................... | G06Q 30/02 705/14.53 |
| 8,538,941 B2 * | 9/2013 | Gartland | ........... | G06F 17/30867 707/705 |
| 8,688,671 B2 * | 4/2014 | Ramer | ................... | G06Q 30/02 707/706 |
| 8,805,861 B2 * | 8/2014 | Boyan | ................. | G06F 17/3089 707/756 |
| 2003/0217066 A1 * | 11/2003 | Kayahara | .......... | G06F 17/30675 |
| 2005/0086226 A1 * | 4/2005 | Krachman | ............. | G06Q 50/16 |
| 2005/0138026 A1 * | 6/2005 | Liu | ...................... | G06F 17/3071 |
| 2006/0004627 A1 * | 1/2006 | Baluja | ................. | H04M 3/4878 705/14.4 |
| 2006/0053174 A1 * | 3/2006 | Gardner | ............ | G06F 17/30707 |
| 2006/0218134 A1 * | 9/2006 | Simske | ............. | G06F 17/30705 |
| 2007/0100812 A1 * | 5/2007 | Simske | ............. | G06F 17/30011 |

(Continued)

OTHER PUBLICATIONS

Ramon Pereda, Information Extraction in an Optical Character Recognition Context, University of Nevada, Las Vegas, 82 pages (Year: 2011).*

(Continued)

*Primary Examiner* — Noosha Arjomandi
(74) *Attorney, Agent, or Firm* — Laurence A. Greenberg; Werner H. Stemer; Ralph E. Locher

(57) ABSTRACT

In a method for processing an electronic document, a local database is used to extract information relating to the document, and a super ordinate database is used to extract information relating to the document if a predefined condition is met. An apparatus, a computer program product and a storage medium can execute the method.

19 Claims, 3 Drawing Sheets

(56) References Cited

U.S. PATENT DOCUMENTS

| | | | | |
|---|---|---|---|---|
| 2007/0168382 | A1* | 7/2007 | Tillberg | G06F 17/30253 |
| 2009/0089315 | A1* | 4/2009 | Jeffery | G06F 17/30011 |
| 2009/0125509 | A1* | 5/2009 | Takebe | G06K 9/2081 |
| 2009/0144277 | A1* | 6/2009 | Trutner | G06F 17/2241 |
| 2009/0216708 | A1* | 8/2009 | Madaan | G06F 17/3071 |
| 2010/0106712 | A1* | 4/2010 | Mizutani | G06F 17/30091 707/715 |
| 2010/0315688 | A1* | 12/2010 | Nielsen | G06K 9/00 358/474 |
| 2010/0331043 | A1* | 12/2010 | Chapman | G01C 21/20 455/556.1 |
| 2011/0083120 | A1* | 4/2011 | Bhandar | G06Q 10/067 717/121 |
| 2011/0258195 | A1* | 10/2011 | Welling | G06K 9/00442 707/740 |
| 2011/0320879 | A1* | 12/2011 | Singh | H04W 24/06 714/38.1 |
| 2012/0041819 | A1* | 2/2012 | Ramer | G06Q 30/0247 705/14.46 |
| 2012/0197862 | A1* | 8/2012 | Woytowitz | G06F 17/30731 707/710 |
| 2013/0085908 | A1* | 4/2013 | Singh | G06Q 10/06 705/30 |
| 2013/0226934 | A1* | 8/2013 | Brautbar | G06Q 30/02 707/748 |
| 2013/0325442 | A1* | 12/2013 | Dahlmeier | G06F 17/276 704/9 |
| 2014/0181114 | A1* | 6/2014 | Schuster | G06F 7/24 707/740 |

OTHER PUBLICATIONS

M. Hanke, et al., "Continuous User Feedback Learning for Data Capture from Business Documents", Hybrid Artificial Intelligent Systems, Lecture Notes in Computer Science vol. 7209, 2012, pp. 538-549, 2012, Springer Verlag.

J. Hu, et al., "Document Image Layout Comparison and Classification", Proceedings of the Fifth International Conference on Document Analysis and Recognition, 1999. ICDAR '99., pp. 285-288.

F. Leymann, et al., "Web services and business process management", IBM Systems Journal, vol. 41, No. 2, 2002, pp. 198-211.

\* cited by examiner

PROCESSING OF AN ELECTRONIC DOCUMENT, APPARATUS AND SYSTEM FOR PROCESSING THE DOCUMENT, AND STORAGE MEDIUM CONTAINING COMPUTER EXECUTABLE INSTRUCTIONS FOR PROCESSING THE DOCUMENT

CROSS-REFERENCE TO RELATED APPLICATION

This application claims the priority, under 35 U.S.C. § 119, of German application DE 10 2012 025 351.6, filed Dec. 21, 2012; the prior application is herewith incorporated by reference in its entirety.

BACKGROUND OF THE INVENTION

Field of the Invention

The invention relates to the processing of an electronic document, in particular the extraction of information from an electronic document.

Different text recognition (also referred to as optical character recognition (OCR)) methods which can be used to recognize text inside images in an automated manner are known. The images are, for example, electronically scanned documents, the content of which is intended to be analyzed further.

The documents may be electronic documents, for example electronically processed, preprocessed or process able documents. The approach can be used, for example, in applications relating to document management or document archiving, for example of business documents, but can also be used for other types of data extraction, for example extraction of information from photographed till receipts and other small documents.

In particular, the present approach is based on extracting data from electronic documents, the accuracy of which can be improved using feedback from at least one user.

Existing services for extracting data or information from documents operate with either global or local model spaces. Local model spaces have the advantage that they can be taught in a domain-specific manner and therefore provide results tailored exactly to the respective user. However, a local approach requires a large amount of training, in particular in the starting phase with a small number of available training documents. In a global model space for all users, other users benefit from the manual indexing work (also referred to as training) which has already been carried out by other users, in particular at the start if the users have extracted few of their own documents. However, the global approach provides a lower extraction rate in the long term since the separation fuzziness between the different training documents increases. Clustering or type classification of the documents thus becomes more difficult. Furthermore, the response time of the system increases with the number of training documents under certain circumstances (depending on the extraction method used). It is also disadvantageous that the training data relating to the other users are supplied to a current user and the confidentiality of the extraction data relating to other users is therefore not ensured.

SUMMARY OF THE INVENTION

The object of the invention is to avoid the abovementioned disadvantages and to make it possible, in particular, to advantageously use data extraction services in such a manner that improved extraction results are achieved.

In order to achieve the object, a method for processing an electronic document is specified, in which a local database is used to extract information relating to the document, and in which a super ordinate database is used to extract information relating to the document if a predefined condition is met.

The local database may be a local model space, in particular in the form of a data bank. The local database and the super ordinate database may contain already classified documents, document types, items of feedback from the user, data fields, values for data fields, etc.

The super ordinate database may be a database of a further physical or logical unit which may be separate from a first unit containing the local database.

In particular, it is possible to provide a plurality of super ordinate databases which are hierarchically arranged; accordingly, the present proposal can be carried out several times in succession in order to obtain a sufficiently good extraction result for the document across a plurality of hierarchical levels.

A particular advantage of the solution presented is that the local database is used in a first step and the material (documents, classifications, fields, values, coordinates, etc.) already present locally is therefore used to produce the best possible classification result; this can be expected, in particular, for those document types which have already been extracted often and for which extensive extraction knowledge is accordingly stored in the local database. If no sufficient extraction knowledge is found locally, the escalation in the super ordinate database uses the information which is available there and possibly comes from a different organizational structure and/or from a different extraction service.

Additionally or alternatively, it is possible to query one of the databases and to use the extraction results (trust values) to decide which result is intended to be used.

The present solution makes it possible for a current user to benefit, in particular, from extraction results which have already been carried out, for example caused or carried out by other users or processes, by virtue of the extraction results being improved or only just enabled for the current user thereby.

For example, extraction services in electronic documents (data extraction services and/or model spaces with training documents which are managed by the data extraction services) can be interconnected in a freely definable hierarchy, in particular without the current user being able to draw conclusions on the contents of the documents belonging to the other users. The confidentiality of the contents is therefore ensured and the extraction results which have already been carried out can nevertheless be used.

When forming the hierarchies, it is possible to represent organizational structures and technical conditions (data protection provisions, etc.), for example.

One development is that the predefined condition includes the fact that the extraction of information using the local database does not provide any results or does not provide any sufficiently good results.

If the intention is to process a document for which the extraction using the local database does not provide any satisfactory results, the super ordinate database is used for extraction in a next step.

Another development is that the predefined condition includes the fact that a sufficient number of training documents or sufficiently similar training documents are not available in the local database.

For example, such training documents may contain training information which has already been extracted and is stored in the local database, for example documents, features, feedback from users, fields, contents of fields, document types, etc. If sufficient training documents for the electronic document to be extracted are not available in the local database, the super ordinate database is therefore used.

In particular, one development is that the predefined condition includes the fact that a quality is determined for the extraction of information using the local database, the quality is compared with a predefined threshold value, and the super ordinate database is used to extract information relating to the document if the quality does not reach the predefined threshold value.

If the extraction carried out using the local database is therefore worse than it should be on the basis of the predefined quality, the super ordinate database is used.

It is also a development that the super ordinate database is used for extraction by virtue of the electronic document being transmitted to the super ordinate database and the extracted information being returned by the super ordinate database.

The super ordinate database can be used by sending a message containing the document, for example, to the further unit. The message may also contain features or parts of the document.

A development is also that at least one extraction algorithm is used to extract information relating to the document.

Within the scope of an additional development, a quality is determined for each extraction proposal for each extraction algorithm.

For example, each extraction algorithm provides a value numeral of between 0 and 1 for each extraction proposal (0: extraction certainty is low; 1: extraction certainty is high), which indicates the certainty of the algorithm for the respective extraction result.

A next development involves determining a total quality taking into account the fields to be extracted and taking into account the quality for each extraction proposal.

In particular, the qualities of the extraction proposals can be averaged.

One refinement is that a document type is determined using a document type recognition method, at least one training document is determined on the basis of the recognized document type, and information relating to the document is extracted using the at least one training document.

If the document type is unknown, either a reduced list of frequently used fields across all document types can be used or the escalation strategy of possibly using the super ordinate database (the super ordinate model space) for extraction can be used.

An alternative embodiment involves using information relating to which fields are intended to be extracted to extract information from the document.

A next refinement is that the information relating to which fields are intended to be extracted is determined using at least one training document.

For example, the frequency of the occurrence of individual fields in the training documents can be detected for each document type (invoice, delivery note, etc.). A current list of the most common data fields can be determined for each document type using this information. The most common data fields can be used to determine which fields or information can be found and/or extracted from the document using the database.

A refinement is also that a manual classification is carried out by a user if the extraction by use of the super ordinate database has not reached a required total extraction quality.

A development involves the classification by the user involving a marking of at least one alphanumeric character, in particular at least one word, in the electronic document.

An additional refinement is that the local database is adapted using the manual classification, the result of the manual classification and/or the electronic document.

Another refinement is that the super ordinate database is adapted using the manual classification, the result of the manual classification and/or the electronic document.

It is also possible for the local database and/or the super ordinate database to have an elimination mechanism which is used to carry out a correction if there are a multiplicity of identical training documents.

For example, it is possible to delete similar or identical training documents, apart from one.

The abovementioned object is also achieved by an apparatus for processing an electronic document, having a processing unit which is set up in such a manner that a local database can be used to extract information relating to the document, and a super ordinate database can be used to extract information relating to the document if a predefined condition is met.

The processing unit mentioned here may be, in particular, in the form of a processor unit, a computer or a distributed system of processor units or computers. In particular, the processing unit may have computers which are connected to one another via a network connection, for example via the Internet.

The database may be or contain a data bank or a data bank management system.

In particular, the processing unit may be or contain any type of processor or computer with accordingly required peripherals (memory, input/output interfaces, input/output devices, etc.).

The above explanations relating to the method accordingly apply to the apparatus. The apparatus may be in one component or distributed in a plurality of components.

One refinement is that the apparatus contains the local database and/or the super ordinate database.

The abovementioned object is also achieved by a system containing at least one of the apparatuses described here.

The solution presented here also contains a computer program product which can be loaded directly into a memory of a digital computer, containing program code parts which are suitable for carrying out steps of the method described here.

The abovementioned problem is also solved by a computer-readable storage medium, for example any desired memory, containing instructions (for example in the form of program code) which can be executed by a computer and are suitable for the computer to carry out steps of the method described here.

The above-described properties, features and advantages of this invention and the manner in which they are achieved become more clearly and distinctly comprehensible in connection with the following schematic description of exemplary embodiments which are explained in more detail in connection with the drawings. In this case, identical or identically acting elements can be provided with identical reference symbols for the sake of clarity.

Other features which are considered as characteristic for the invention are set forth in the appended claims.

Although the invention is illustrated and described herein as embodied in a processing of an electronic document, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
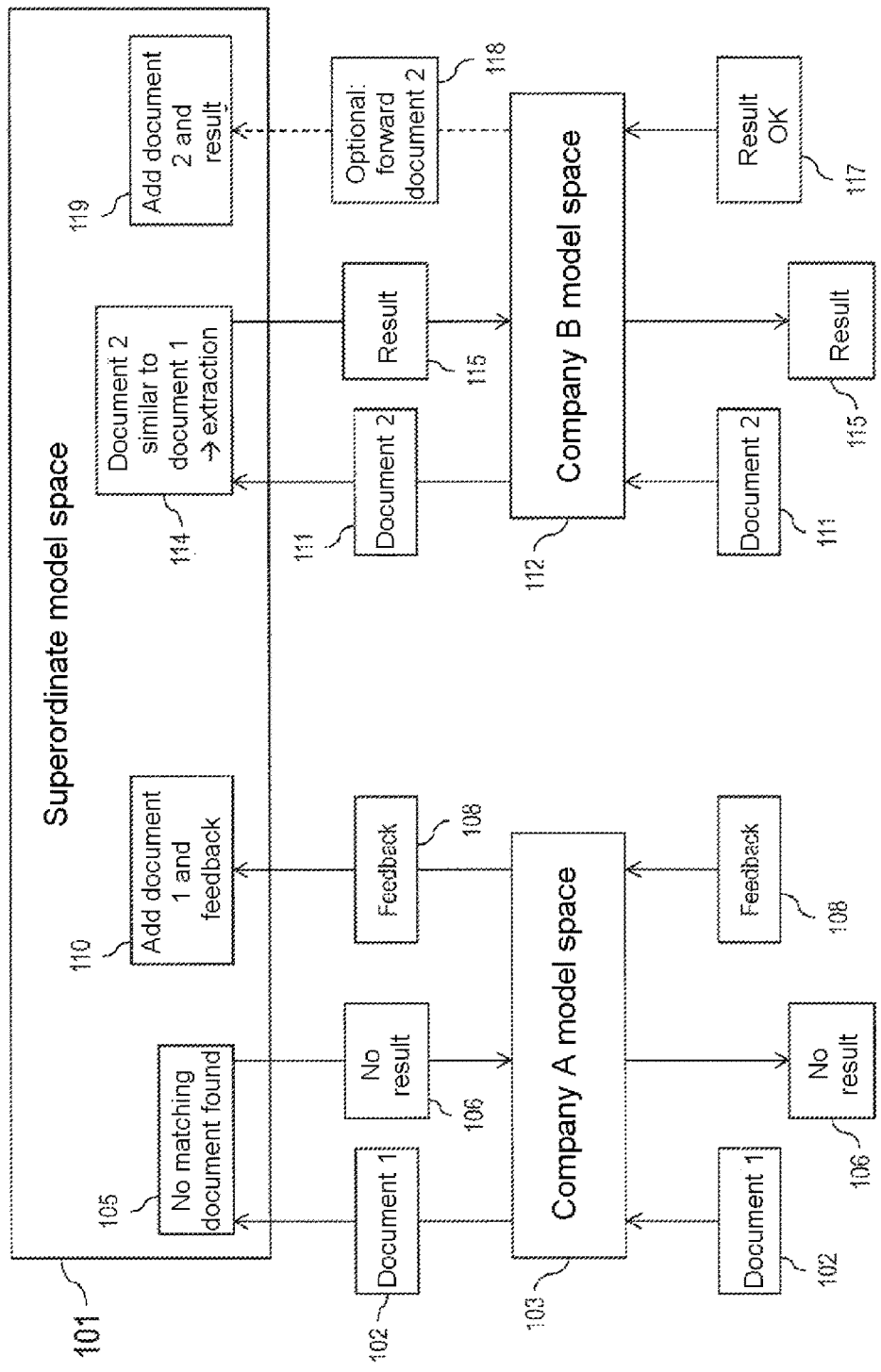
FIG. 1 is a schematic diagram illustrating model spaces which are hierarchically arranged, for example and according.

The approach presented here contains or uses, in particular, some of the now explained steps.

(1) An architecture, for example in the form of a software interface, is preferably offered and provides a service (for example containing a data extraction service) which can be called via an interface (for example REST, SOAP or TCP sockets). The interface accepts, as an input, an electronic document (for example after OCR preprocessing and/or in the form of a textual and/or graphical representation), for example.

In the case of REST, a URL (Uniform Resource Locator, for example a link) may represent precisely a page content as the result of an action by a server (for instance the display of a list of hits after a search) (according to the HTTP Internet standard for static contents, Permalink). URLs from the web browser can be advantageously stored as bookmarks and can be called again at any desired later time. The URLs may also be forwarded to third parties and may be called by the latter in order to trigger the same action, for example a search (compare, for example: http://de.wikipedia.org/wiki/Representational_State_Transfer, http://de.wikipedia.org/wiki/SOAP and http://de.wikipedia.org/wiki/Socket_%28Software%29).

A programming interface (API: Application Programming Interface) can also be implemented with SOAP or TCP sockets.

(2) The service mentioned in (1) executes at least one data extraction algorithm for at least one electronic document and returns, as the result, data fields with the values extracted from the document (for example sender: "Company ABC", date: "Dec. 31, 2011", etc.).

(3) Every service may provide at least one model space in which the user can store training examples (for example in the form of electronic documents which have already been classified) for user-specific adaptation and improvement of data extraction. The model space can generally be implemented or provided by a database, for example in the form of a data bank.

A training example contains, for example, a training document in at least one representation (for example in the form of an OCR-preprocessed document whose content is at least partially in the form of electronically recognizable and process able characters, graphical, etc.), data fields which have been input by the user, values of these data fields, and/or positions of the data fields or of the rectangles surrounding the data fields.

The positions relate, for example, to coordinates inside the graphical representation of the training document.

(4) Interconnection in hierarchies is preferably effected by virtue of selected documents (and/or parts thereof, in particular information relating to at least one document) and/or feedback from the user (or a plurality of users) being forwarded to at least one super ordinate model space beyond the current model space. The forwarding is affected, for example, via one of the interfaces referred to in (1).

Documents in a hierarchy are preferably forwarded to the next higher hierarchical level above (collection stage, super ordinate model space). The results of the service mentioned in (2) for a test document, for example, are passed to a hierarchical level below at the request of this hierarchical level.

This ensures that no documents or contents of the documents are interchanged between organizations and different organizations can nevertheless use a common super ordinate model space.

(5) After data extraction, for example local data extraction in a local database or the (not very successful or unsuccessful) attempt at such local data extraction, an escalation strategy for documents can be used, for example. This is advantageous particularly when a super ordinate model space in the hierarchy is provided for a model space.

According to the escalation strategy, it is first of all decided, for example, whether the document is additionally passed upwards in the hierarchy in order to carry out data extraction there. This is advantageous particularly when the next higher hierarchical level has a larger set of training documents (possibly from different organizations) and can therefore possibly provide better extraction results.

When making the decision, a compromise between improving the extraction results (by passing the document to the next higher hierarchical level) and avoiding unnecessary system loading and a shortened response time until the extraction result can be provided (if the document is not forwarded to the next higher hierarchical level) is taken into account, for example.

(6) The escalation strategy for documents is based, for example, on a quality of the results provided by the local extraction process.

For example, each extraction algorithm provides a value numeral of between 0 and 1 for each extraction proposal (0: extraction certainty is low; 1: extraction certainty is high), which indicates the certainty of the algorithm for the respective extraction result.

(7) In addition to the value numerals for the individual extracted fields (or the extracted values of the fields), information relating to which fields are actually intended to be extracted from the document is used.

A data bank which records the frequency of the occurrence of individual fields in the training documents for each document type (invoice, delivery note, etc.) is managed for this purpose, for example. A current list of the most common data fields can be determined for each document type using this information.

(8) A total extraction quality, for example, is determined by combining the information from steps (6) and (7) using the data extraction which is locally carried out. A total value numeral which determines an average confidence for the list of fields from step (7) by averaging the respective value numerals for the fields from step (6) is calculated.

(9) Step (8) is based on the best possible recognition of the document type. Methods which can be used to classify document types with a high degree of certainty are known.

In this respect, reference is made, for example, to an article by Hu, J., Kashi, R., and Wilfong, G., entitled "Comparison and Classification of Documents Based on Layout Similarity", Information Retrieval 2 (2), 227-243 (2000)] or by Daniel Esser, Daniel Schuster, Klemens Muthmann, Michael Berger and Alexander Schill, entitled "Automatic Indexing of Scanned Documents—a Layout-based Approach", IS&T/SPIE Document Recognition and Retrieval XIX (DRR 2012), San Francisco, Calif., USA, 2012].

If the document type is unknown, either a reduced list of frequently used fields across all document types can be used or the escalation strategy can be carried out or rejected.

(10) The decision for or against the escalation strategy of the document can be made, for example, by comparing the total extraction quality determined in step (8) with a predefined threshold value. This threshold value can be determined, for example, by automated tests with a classified document corpus or can be predefined in some other manner.

Alternatively or additionally, an escalation strategy could be used by transferring the document to the super ordinate model space, for example when the similarity of the training documents in the local model space to the current document (extraction document) is too low.

(11) If the escalation is intended to be used, the document is transferred to the super ordinate model space for data extraction. The data extraction results are returned to the local model space. In the case of multilevel hierarchies, forwarding is possibly carried out via a plurality of hierarchical levels.

(12) If the results provided by the super ordinate model space still do not correspond to the required total extraction quality according to (8) or (10), the document is submitted to the user for manual assessment or classification. In this case, it is noted that the document can also be submitted to the user for manual assessment or classification in the other cases.

The user can then create a training example according to (3) which is transferred to the local model space. The training example is assessed according to an escalation strategy relating to the feedback from the user (see (14)) and is possibly transferred to the super ordinate model space.

(13) If it is determined, after (11) and the renewed check of the results of the super ordinate model space according to (8) or (10), that the results comply with the required total extraction quality, these results are returned to the user.

It is now possible to decide whether the results of the super ordinate model space are intended to be included, as training data, in the local model space together with the locally available test document. This decision may depend on different influencing factors, for example a number of identical training documents, a total number of training documents, an average extraction quality, etc.

(14) Like the decision according to (13), the escalation decision for obtaining (possibly additional) user feedback according to (12) depends on a multiplicity of factors, for example a frequency of identical training documents, a total extraction quality of the super ordinate model space for the present test document, etc.

One possible approach is to always forward the user feedback according to (12) to the super ordinate model space, the super ordinate model space possibly independently carrying out a correction using suitable elimination mechanisms if there are too many identical training documents.

FIG. 1 shows, by way of example, two hierarchically arranged model spaces. The method can be extended to any desired hierarchy of model spaces according to the illustrations in FIG. 2 and FIG. 3. Elimination strategies are then preferably used in the super ordinate model spaces to remove training documents which are rarely used for extraction. In particular, step (11) can be extended to the effect that a call chain with a plurality of super ordinate model spaces is produced. This results in a self-regulating system which makes it possible for different users to mutually benefit from manual classifications without the training documents themselves having to be interchanged.

According to FIG. 1, a document 102 is supplied to a model space 103 belonging to company A for extraction or classification, for example. The model space 103 forwards the document 102 to a super ordinate model space 101 in which the extraction is intended to be carried out. In a step 105, no matching document is found for the document 102 and this is reported back to the user as "no result" 106 via the model space 103. The user provides feedback 108 on the document 102 by carrying out, for example, a manual or partially automated classification of data fields and values and transmitting the classification to the model space 103. The model space 103 forwards the feedback 108 to the super ordinate model space 101, and the document 102 and the feedback 108 are added there to a data bank, for example, so that downstream extraction mechanisms can also carry out automatic or automated information extraction on the basis of the document 102.

Furthermore, a document 111 of the type of document 102 (for example, both may be invoices from the same invoice issuer) is supplied to a model space 112 belonging to company B for extraction or classification. The model space 112 forwards the document 111 to the super ordinate model space 101 in which the extraction is intended to be carried out. In a step 114, a matching document is found for the document 111, namely the previously stored document 102, and an extraction result 115 based thereon is reported back to the user via the model space 112. The user accepts the result in a step 117. Optionally, the document 111 can then also be forwarded to the super ordinate model space 101 in a step 118 and can be added to the model space 101 there, possibly together with the extraction result 115.

In this case, it is noted that, in order to illustrate the collaboration with the super ordinate model space 101, the model spaces 103 and 112, for example, themselves do not carry out any extraction, for example because no usable documents or document types are present locally. The model spaces are also referred to as databases.

Figure 2:
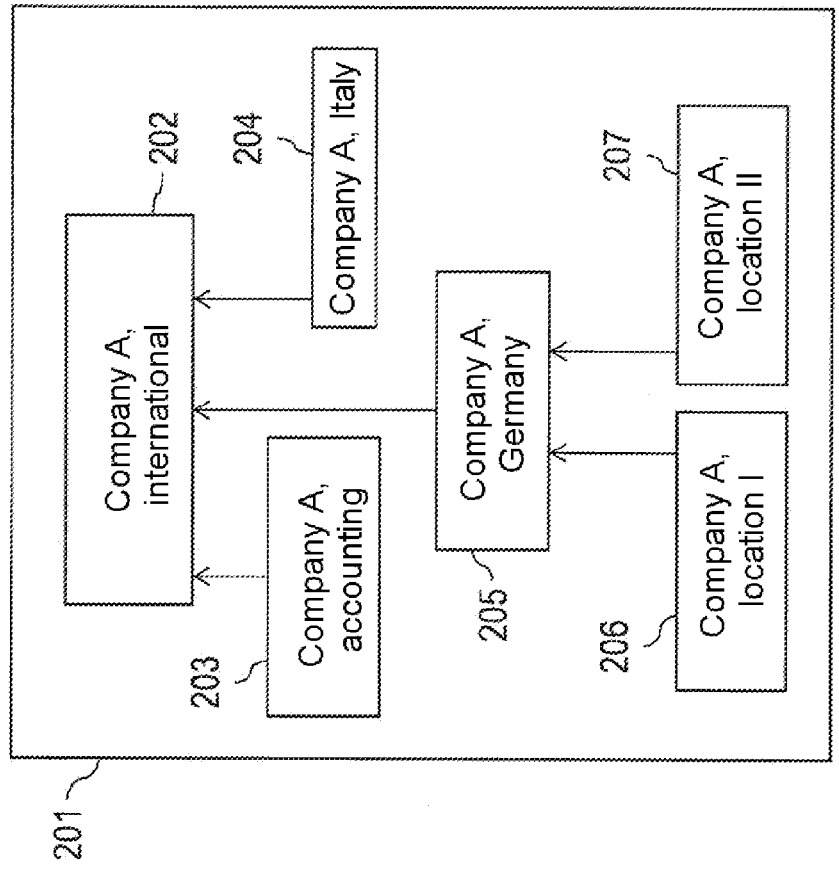
FIG. 2 is a diagram which illustrates, by way of example, a multilevel hierarchy of model spaces.

FIG. 2 shows an example of a multilevel hierarchy 201 of a company A with a plurality of model spaces 202 to 207, the model spaces providing different escalation mechanisms by virtue of their hierarchical arrangement. The model space 206 relates to a location I and the model space 207 relates to a location II of company A; both can use, as the super ordinate model space 205, the model space of company A for Germany. The model space 203, the (worldwide) accounting for company A, and the model space 204 of company A for Italy are also provided and, together with the model space 205, can use the super ordinate model space 202 of company A (at the international level). Therefore, the escalation strategy can take into account the fact that the respectively super ordinate model space is used if a document cannot be automatically extracted locally (with a predefined quality).

This can be carried out several times in succession as long as there is still a super ordinate model space and the extraction result was not sufficiently good or could not provide a result.

Figure 3:
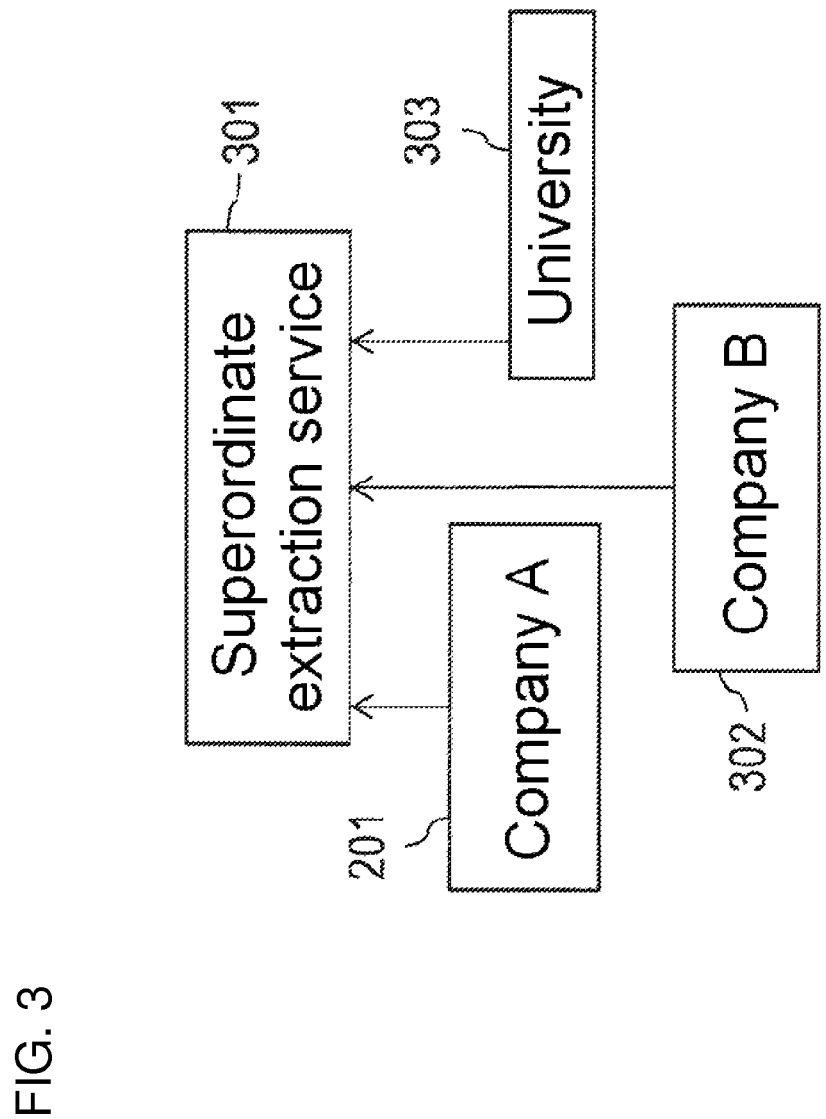
FIG. 3 is a diagram illustrating a further multilevel hierarchy with the inclusion of the hierarchy from FIG. 2.

FIG. 3 shows, by way of example, a diagram with a further escalation level. The multilevel hierarchy 210 is part of the illustration here and is arranged parallel to a (possibly multilevel) model space 302 of a company B and a (possibly multilevel) model space 303 of a university. A model space or extraction service 301 super ordinate to the model spaces 201, 302 and 303, as can be provided by an extraction service provider for example, is also illustrated. The extraction service 301 can ensure, for example, that company A extracts information using information which has already been extracted from documents belonging to company B, the contents of the documents belonging to company B not being visible to company A (and vice versa). The confidentiality of the contents can therefore be ensured by the extraction service 301. However, the extraction mechanisms comprising, for example, the data fields with associated positions of the associated values can be made available and used across company boundaries or organizational boundaries.

The solution presented therefore makes it possible to interrogate super ordinate model spaces for their knowledge of certain documents. A comparison with a predefined extraction quality or an extraction quality to be achieved makes it possible to locally determine whether or not an escalation strategy should be used: if the locally achievable extraction quality is not good enough for example, it is possible to access super ordinate model spaces by means of queries. On the other hand, setting the extraction quality to be achieved effectively ensures that the super ordinate model spaces are not overloaded by a multiplicity of queries. The extraction quality can be set dynamically, for example, and the loadability and/or a load ability specification of the system can therefore be taken into account. Effective cooperative data extraction in a distributed approach is therefore possible as a result.

The approach makes it possible to continuously adapt the knowledge required for data extraction in a group of data extraction services. As a result, a system can quickly adapt to amended or new document types or frequencies of particular document types, on the one hand, and the system still provides the advantages of local data extraction as a result of a high extraction quality with short response times and the possibility of domain-dependent training, on the other hand.

Although the invention was described and illustrated in more detail by means of the at least one exemplary embodiment shown, the invention is not restricted thereto and other variations can be derived there from by a person skilled in the art without departing from the scope of protection of the invention.

The invention claimed is:

1. A method for processing an electronic document, which comprises the steps of:
    extracting information relating to the electronic document via a local database, wherein the electronic document is an electronically scanned optical character recognized preprocessed document;
    extracting the information relating to the electronic document when a predefined condition is met via a super ordinate database, the predefined condition includes a fact that an extraction of the information via the local database does not provide any results or does not provide any good results, the extracting step including the following substeps:
        providing the predefined condition with a fact that a quality is determined for an extraction of the information using the local database;
        comparing the quality with a predefined threshold value: and
        using the super ordinate database to extract the information relating to the electronic document when the quality does not reach the predefined threshold value;
    using information relating to which fields are intended to be extracted to extract the information from the electronic document; and
    determining the information relating to which fields are intended to be extracted using at least one training document.

2. The method according to claim 1, wherein the predefined condition includes a fact that a sufficient number of training documents or sufficiently similar training documents are not available in the local database.

3. The method according to claim 1, which further comprises using the super ordinate database for extraction by virtue of the electronic document being transmitted to the super ordinate database and the information extracted being returned by the super ordinate database.

4. The method according to claim 1, which further comprises performing at least one extraction algorithm for extracting the information relating to the electronic document.

5. The method according to claim 4, which further comprises determining a quality for each extraction proposal for each said extraction algorithm.

6. The method according to claim 5, which further comprises determining a total quality taking into account fields to be extracted and taking into account the quality for each said extraction proposal.

7. The method according to claim 1, which further comprises:
    determining a document type by performing a document type recognition method, at least one training document is determined on a basis of a recognized document type; and
    extracting information relating to the electronic document using the at least one training document.

8. The method according to claim 1, which further comprises carrying out a manual classification by a user when the extraction by means of the super ordinate database has not reached a required total extraction quality.

9. The method according to claim 8, wherein the manual classification by the user involves a marking of at least one alphanumeric character in the electronic document.

10. The method according to claim 8, which further comprises adapting the local database using the manual classification, a result of the manual classification and/or the electronic document.

11. The method according to claim 10, wherein the local database has an elimination mechanism used to carry out a correction when there are a multiplicity of identical training documents.

12. The method according to claim 8, which further comprises adapting the super ordinate database using the manual classification, a result of the manual classification and/or the electronic document.

13. The method according to claim 12, wherein the super ordinate database has an elimination mechanism used to carry out a correction when there are a multiplicity of identical training documents.

14. The method according to claim 8, wherein the manual classification by the user involves a marking of at least one word in the electronic document.

15. An apparatus for processing an electronic document, the apparatus comprising:
a computer set up such that a local database can be used to extract information relating to the electronic document, and a super ordinate database can be used to extract the information relating to the electronic document when a predefined condition is met, the predefined condition including a fact that an extraction of the information via the local database does not provide any results or does not provide any good results, wherein the electronic document is an electronically scanned optical character recognized preprocessed document, said computer being programmed to:
provide the predefined condition with a fact that a quality is determined for an extraction of the information using the local database;
compare the quality with a predefined threshold value;
use the super ordinate database to extract the information relating to the electronic document when the quality does not reach the predefined threshold value;
use information relating to which fields are intended to be extracted to extract the information from the electronic document; and
determine the information relating to which fields are intended to be extracted using at least one training document.

16. The apparatus according to claim 15, further comprising:
said local database; and/or
said super ordinate database.

17. A system for processing an electronic document, comprising:
at least one apparatus having a computer set up such that a local database can be used to extract information relating to the electronic document, and a super ordinate database can be used to extract the information relating to the electronic document when a predefined condition is met, the predefined condition including a fact that an extraction of the information via the local database does not provide any results or does not provide any good results, wherein the electronic document is an electronically scanned optical character recognized preprocessed document, said computer being programmed to:
provide the predefined condition with a fact that a quality is determined for an extraction of the information using the local database;
compare the quality with a predefined threshold value;
use the super ordinate database to extract the information relating to the electronic document when the quality does not reach the predefined threshold value;
use information relating to which fields are intended to be extracted to extract the information from the electronic document; and
determine the information relating to which fields are intended to be extracted using at least one training document.

18. Computer executable instructions to be loaded into a non-transitory memory of a digital computer, for performing a method for processing an electronic document, which comprises the steps of:
extracting information relating to the electronic document via a local database, wherein the electronic document is an electronically scanned optical character recognized preprocessed document;
extracting the information relating to the electronic document when a predefined condition is met via a super ordinate database, the predefined condition including a fact that an extraction of the information via the local database does not provide any results or does not provide any good results, the extracting step including the following substeps:
providing the predefined condition with a fact that a quality is determined for an extraction of the information using the local database;
comparing the quality with a predefined threshold value; and
using the super ordinate database to extract the information relating to the electronic document when the quality does not reach the predefined threshold value;
using information relating to which fields are intended to be extracted to extract the information from the electronic document; and
determine the information relating to which fields are intended to be extracted using at least one training document.

19. A non-transitory computer-readable storage medium having computer executable instructions to be executed by a computer for performing a method for processing an electronic document, which comprises the steps of:
extracting information relating to the electronic document via a local database, wherein the electronic document is an electronically scanned optical character recognized preprocessed document;
extracting the information relating to the electronic document when a predefined condition is met via a super ordinate database, the predefined condition including a fact that an extraction of the information via the local database does not provide any results or does not provide any good results, the extracting step including the following substeps:
providing the predefined condition with a fact that a quality is determined for an extraction of the information using the local database;
comparing the quality with a predefined threshold value; and
using the super ordinate database to extract the information relating to the electronic document when the quality does not reach the predefined threshold value;
using information relating to which fields are intended to be extracted to extract the information from the electronic document; and
determining the information relating to which fields are intended to be extracted using at least one training document.

* * * * *